US012768746B2

(12) United States Patent
Sugimoto

(10) Patent No.: US 12,768,746 B2
(45) Date of Patent: Oct. 20, 2026

(54) APPARATUS, MEASUREMENT METHOD, AND MANUFACTURING METHOD

(71) Applicant: CANON KABUSHIKI KAISHA, Tokyo (JP)

(72) Inventor: Tomohiro Sugimoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 19/041,496

(22) Filed: Jan. 30, 2025

(65) Prior Publication Data

US 2025/0251301 A1 Aug. 7, 2025

(30) Foreign Application Priority Data

Feb. 6, 2024 (JP) ................................ 2024-016724

(51) Int. Cl.

*G01M 11/02* (2006.01)
*G01B 9/0209* (2022.01)

(52) U.S. Cl.

CPC ....... *G01M 11/0271* (2013.01); *G01B 9/0209* (2013.01); *G01M 11/0207* (2013.01); *G01M 11/0221* (2013.01)

(58) Field of Classification Search

CPC ......... G01M 11/0271; G01M 11/0207; G01M 11/0221; G01B 9/0209
USPC ........................................................ 356/450
See application file for complete search history.

(56) References Cited

U.S. PATENT DOCUMENTS

2008/0137090 A1* 6/2008 Hetzler ............. G01B 11/2441 356/458
2014/0017603 A1* 1/2014 Mori ..................... G02B 5/008 430/5

FOREIGN PATENT DOCUMENTS

JP 2005164267 A 6/2005

* cited by examiner

*Primary Examiner* — Md M Rahman
(74) *Attorney, Agent, or Firm* — Canon U.S.A., Inc. IP Division

(57) ABSTRACT

An apparatus includes a first light source for illuminating a chart including an index surface on which an index is provided, an objective lens for guiding index light emitted from the chart to an optical system, a first element for receiving the index light reflected on an optical surface in the optical system, an interferometer configured to include a second light source and a second element, and acquire a wavefront of measurement light, the measurement light being test light reflected on the target surface, and a reduction unit for reducing an intensity of a signal of light reflected on an optical surface other than the target surface, of the test light reflected on the plurality of optical surfaces and received by the second element.

20 Claims, 8 Drawing Sheets

APPARATUS, MEASUREMENT METHOD, AND MANUFACTURING METHOD

BACKGROUND

Technical Field

The aspect of the embodiments relates to a measurement technique for measuring eccentricity of an optical surface in an optical system.

Description of the Related Art

An optical performance of an optical system including a plurality of optical elements is affected by arrangement accuracy of each optical element. In order to measure whether each optical element is arranged at a desired position, a technique for measuring eccentricity of an optical surface of each optical element is known.

Japanese Patent Application Laid-Open No. 2005-164267 discusses an apparatus that measures eccentricity of an optical surface in a target optical system including a plurality of optical surfaces. The apparatus discussed in Japanese Patent Application Laid-Open No. 2005-164267 projects index light onto an apparent spherical center position of each target surface among a plurality of optical surfaces. Next, the apparatus moves the target optical system and a projection optical system relative to each other according to a position of an image formed by light, which is the projected index light reflected on the target surface. Then, eccentricity of the optical surface is measured based on an amount of relative movement between the target optical system and the projection optical system.

SUMMARY

An apparatus includes a first light source configured to illuminate a chart including an index surface on which an index is provided, an objective lens configured to guide index light emitted from the chart to an optical system, a first element configured to receive the index light reflected on an optical surface in the optical system, an interferometer configured to include a second light source and a second element, split light from the second light source into test light and reference light, receive measurement light via the objective lens and the reference light with the second element, and acquire a wavefront of the measurement light, the measurement light being the test light reflected on a target surface, and a reduction unit configured to reduce an intensity of a signal of light reflected on an optical surface other than the target surface, of the test light reflected on the plurality of optical surfaces and received by the second element.

Further features of the embodiment will become apparent from the following description of exemplary embodiments with reference to the attached drawings.

DESCRIPTION OF THE EMBODIMENTS

Figure 1:
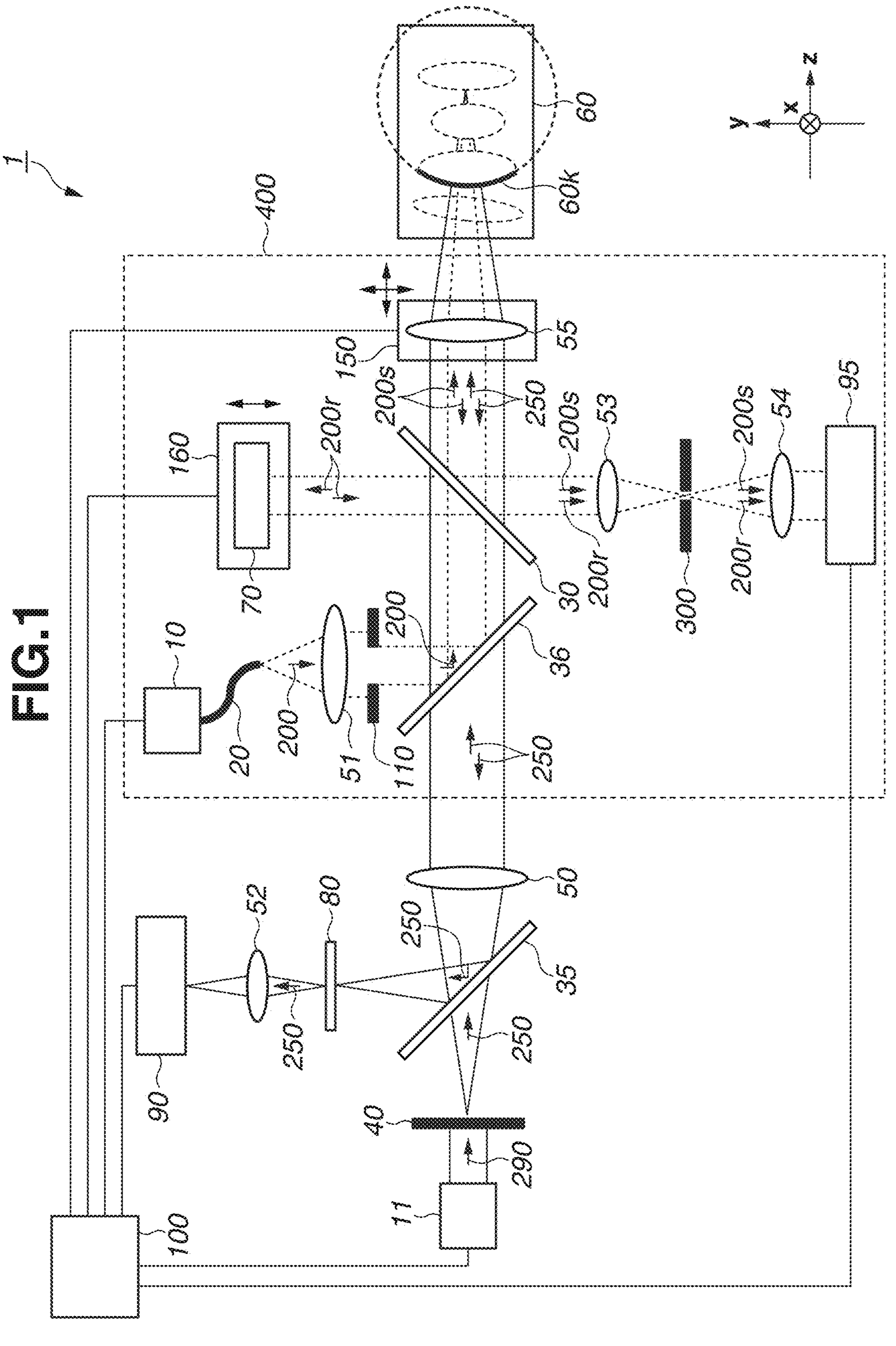
FIG. 1 illustrates a configuration of a measurement apparatus according to a first exemplary embodiment.

Exemplary embodiments according to the present disclosure will be described below with reference to the attached drawings. Each drawing may be drawn at a different scale from an actual scale for convenience. Further, the same reference numerals are used for the similar members in each drawing to avoid repetition in descriptions.

Figure 2:
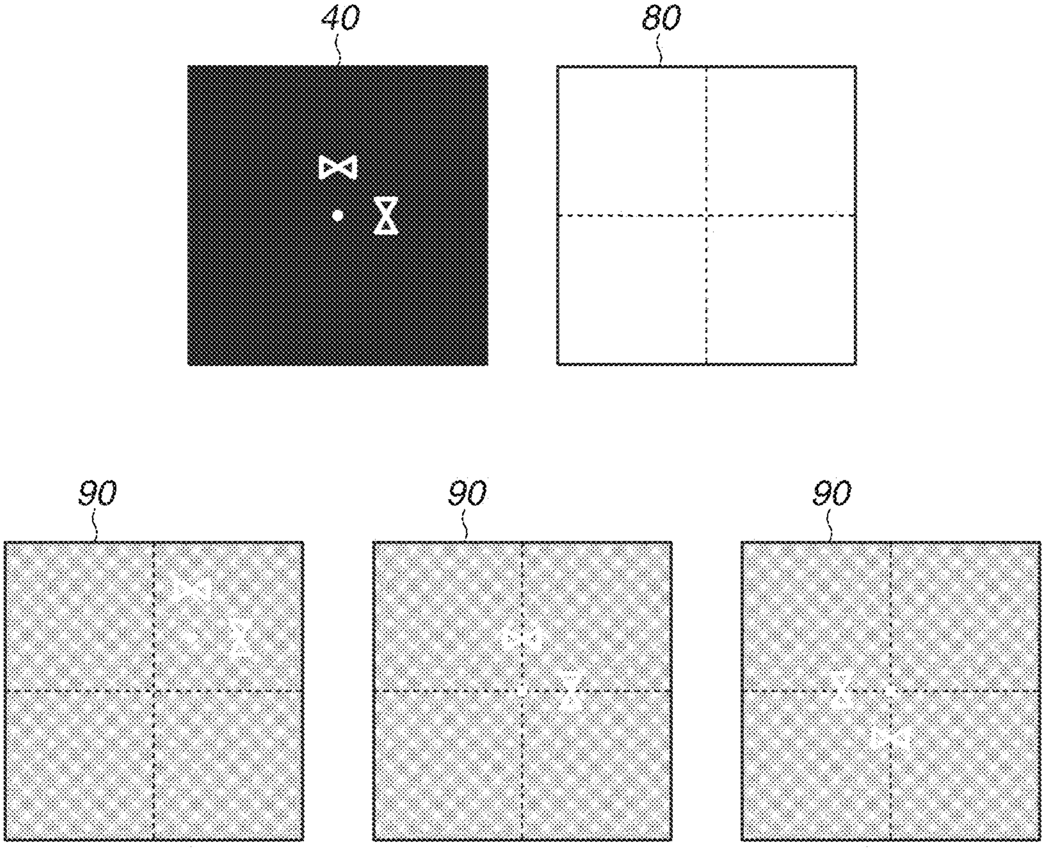
FIG. 2 schematically illustrates a chart, an image-forming surface chart, and images captured by an imaging element according to the first exemplary embodiment.

FIG. 1 illustrates a configuration of a measurement apparatus 1 according to a first exemplary embodiment. FIG. 2 illustrates schematic diagrams of a chart, an image-forming surface chart, and images captured by an imaging element according to the first exemplary embodiment.

The measurement apparatus 1 includes an illumination light source (first light source) 11, a chart 40, an objective lens 55, a first imaging element 90, a stage (adjustment unit) 150, a low-coherence interferometer 400, and a computer (calculation unit) 100. A target optical system 60 is an optical system configured by combining a plurality of lenses, and the measurement apparatus 1 measures eccentricity of a plurality of optical surfaces (the number of surfaces is N) in the target optical system 60.

The first light source 11 emits illumination light 290 to illuminate the transmissive chart 40. The first light source 11 according to the present exemplary embodiment includes, for example, a halogen lamp or a light emitting diode (LED). A processor in the measurement apparatus 1, an external apparatus, or another storage medium can be used as a calculation unit. The first imaging element 90 (and an imaging element 95 described below) are, for example, a charge coupled device (CCD) sensor or a complementary metal-oxide semiconductor (CMOS) sensor.

An upper left diagram in FIG. 2 is a schematic diagram of the chart 40 according to the present exemplary embodiment. The chart 40 includes an index surface on which an index is provided. White portions in the upper left diagram in FIG. 2 indicate areas through which light passes. If a position of a white circle is the origin of the chart 40, patterns (white triangles) formed on the chart 40 according to the present exemplary embodiment are asymmetric with respect to the origin.

In one embodiment, the chart 40 including the patterns that are asymmetric with respect to the origin as illustrated in the upper left diagram in FIG. 2 is used because this makes it easy to determine whether a position of the origin of the chart image formed by the index light 250 is at the center of curvature of the optical surface or on a surface of the optical surface. For example, in a case where the chart 40 in the upper left diagram in FIG. 2 is used, an image as illustrated in a lower right diagram in FIG. 2 (an image in which the chart image is inverted with respect to the origin compared with an image in a lower middle diagram in FIG. 2) is observed if the chart image is formed at the surface position of the optical surface. Further, in a case where the objective lens 55 is arranged near a design position in step S30 (described below), the index light may be condensed on the surface of the optical surface other than a target surface, and a plurality of chart images may be observed on the first imaging element 90. Even in such cases, the chart 40 including the asymmetrical patterns is used because this makes it easy to distinguish the reflected light from the target surface.

According to the present exemplary embodiment, a chart having a shape illustrated in the upper left diagram in FIG. 2 is used as the chart 40, but the shape is not limited to this. The shape of an area through which light passes may also be an arbitrary shape, and, for example, a cross, a circle, and a square may be arranged instead of a triangle.

The chart 40 emits divergent light (index light) 250. The patterns formed on the chart 40 (the white circle and the white triangles in the upper left diagram in FIG. 2) are close to each other (e.g., at a distance of 1 mm or less), so that they are drawn in FIG. 1 as if they are light diverging from a single point.

The index light 250 having passed through a beam splitter 35 is collimated by a collimator lens 50, passes through beam splitters 36 and 30, and is condensed by the objective lens 55 to enter the target optical system 60. The objective lens 55 is placed on the stage 150 that moves in each of X, Y, and Z directions illustrated in FIG. 1, thereby enabling to adjust a position of a chart image (real image or virtual image) formed by the index light 250. A position of the stage 150 is managed by the computer 100.

A method for adjusting a relative position between the objective lens 55 and the target optical system 60 is not limited to this. For example, the objective lens 55 may be fixed, the target optical system 60 may be placed on a stage, and the position of the target optical system 60 may be adjusted. Both the objective lens 55 and the target optical system 60 may also include an adjustment unit. Furthermore, all optical elements including the objective lens 55 other than the target optical system 60 may be placed on the stage, and the relative position between the objective lens 55 and the target optical system 60 may be adjusted by collectively moving positions of these optical elements.

In measurement, the position (X, Y, Z) of the origin of the chart image formed by the index light 250 is brought close to a position (Xc, Yc, Zc) of an apparent center of curvature of a k-th (k=1, 2, . . . , N) optical surface (a target surface 60*k*) in the target optical system 60. The index light 250 is thereby reflected on the target surface 60*k* and travels backward along a light path similar to an incident light path. In other words, the index light 250 having been reflected on the target surface 60*k* passes through the objective lens 55, the beam splitters 30 and 36, and the collimator lens 50, and reaches the beam splitter 35. A portion of the index light 250 is reflected by the beam splitter 35 and enters an image-forming surface chart 80.

At this time, the image of the chart 40 is formed on the image-forming surface chart 80. Further, an imaging lens 52 forms the image on the image-forming surface chart 80 on the first imaging element 90. The first imaging element 90 captures the image of the chart 40. The image acquired by the first imaging element 90 is transmitted to the computer 100. The index light 250 reflected on the optical surface other than the target surface 60*k* travels backward as light with a different degree of convergence/divergence with respect to the incident light, so that it does not form an image on the first imaging element 90.

The image-forming surface chart 80 according to the present exemplary embodiment has reference lines (dashed lines) drawn thereon as illustrated in an upper right diagram in FIG. 2. Thus, the first imaging element 90 captures an image of the chart and an image of the reference lines at the same time. The image-forming surface chart 80 is not limited to this, and a similar effect can be achieved with a chart of an arbitrary shape. The reference lines may be drawn directly on a display that displays an image acquired by the first imaging element 90 or may be displayed by being overlaid on image data.

A lower left diagram in FIG. 2 is a schematic diagram of an image captured by the first imaging element 90 in a case where the position (X, Y, Z) of the origin of the chart image and the position (Xc, Yc, Zc) of the apparent center of curvature of the target surface 60*k* have a relationship of X≠Xc, Y≠Yc, and Z=Zc. The lower middle diagram in FIG. 2 is a schematic diagram of an image captured by the first imaging element 90 in a case where X=Xc, Y=Yc, and Z=Zc. The lower middle diagram in FIG. 2 is similar to an image that is observed when a plane mirror is placed between the collimator lens 50 and the objective lens 55 to be parallel to an XY plane, and the index light 250 is reflected by the plane mirror. A position of the image at this time is set as a reference position according to the present exemplary embodiment. For the sake of simplifying the description, the lower left and lower middle diagrams in FIG. 2 illustrate examples in which the arrangement and vertical and horizontal directions of the patterns match those in the upper left diagram in FIG. 2. The arrangement and the vertical and horizontal directions of the patterns are not limited to these, and an image that is vertically and horizontally inverted may be acquired depending on the vertical and horizontal directions of the first imaging element 90 and signal processing by the computer 100.

The low-coherence interferometer 400 according to the present exemplary embodiment is a Twyman-Green type interferometer including a low-coherence light source (second light source) 10, a fiber 20, a collimator lens 51, a collimator lens 54, a diaphragm 110, the beam splitter 30, the beam splitter 36, the objective lens 55, a reference mirror 70, a reference stage (change unit) 160, a condenser lens 53, a spatial filter 300, and the second imaging element 95. The spatial filter 300 is, for example, a pinhole or a diaphragm, and corresponds to a reduction unit according to the present exemplary embodiment.

The measurement apparatus 1 according to the present exemplary embodiment includes the diaphragm 110 between the collimator lens 51 and the beam splitter 36. The position of the objective lens 55 can be adjusted with high accuracy by narrowing a light flux of low-coherence light 200 with the diaphragm 110 to reduce an irradiated area on the target surface 60*k* even in a case where the target surface 60*k* is an aspheric surface having a plurality of apparent spherical center positions. This is because the aspheric surface can be regarded as a spherical surface by reducing the irradiated area with the diaphragm 110. In one embodiment, the index light 250 requires a light ray with a high spatial frequency to some extent (a large light flux including peripheral light rays) to form a chart image, but the low-coherence light 200 may be a light ray with a low spatial frequency (a light flux smaller than the light flux of the index light) as long as it can form interference fringes.

According to the present exemplary embodiment, the diaphragm 110 is placed between the collimator lens 51 and the beam splitter 36, but is not limited to this. The diaphragm 110 may be placed anywhere before irradiation on the target surface 60*k*. For example, the diaphragm 110 may be placed between the beam splitter 30 and the objective lens 55. Alternatively to a method for placing the diaphragm, the irradiated area can also be reduced by changing a numerical aperture (NA) of the collimator lens 51 to be larger than an NA of the fiber 20. The same effect is achieved even with this configuration.

The second light source 10 is a broadband light source, such as an LED or a super luminescent diode (SLD). As the second light source 10, a semiconductor laser with a relatively short coherence length may also be used. The low-coherence light 200 emitted from the second light source 10 is emitted through the fiber 20, collimated by the collimator lens 51, passes through the diaphragm 110, and then is reflected by the beam splitter 36. The low-coherence light 200 reflected by the beam splitter 36 propagates in the same direction as the index light 250, and is split by the beam splitter 30 into reflected light (reference light) 200*r* and transmitted light (test light) 200*s*.

The reference light 200*r* reflected by the beam splitter 30 is reflected by the reference mirror 70 placed on the reference stage 160, and returns to the beam splitter 30. The reference stage 160 can move in an arrow direction (Y direction) illustrated in FIG. 1 and change a light path length of the reference light 200*r* (reference light path length). A position of the reference stage 160 according to the present exemplary embodiment is managed by the computer 100.

Between the beam splitter 30 and the reference mirror 70, a neutral density (ND) filter for adjusting an intensity of the reference light 200*r* and the like may be placed. The reference mirror 70 may be a metal mirror with high reflectance, but may be a glass surface with reflectance similar to that of the optical surface. A portion of the reference light 200*r* passes through the beam splitter 30, is condensed by the condenser lens 53, diverges after passing through the spatial filter 300, is collimated by the collimator lens 54, and enters the second imaging element 95.

Test light 200*s* having passed through the beam splitter 30 is condensed by the objective lens 55 and enters the target optical system 60. Similarly to the index light 250, the test light 200*s* is reflected on the target surface 60*k* and travels backward along a light path similar to the incident light path in a case where a position of an apparent condensing point of the test light 200*s* coincides with the position of the apparent center of curvature of the target surface 60*k*. The test light (measurement light) 200*s* reflected on the target surface 60*k* is collimated by the objective lens 55 to reach the beam splitter 30. A portion of the test light (measurement light) 200*s* is reflected by the beam splitter 30, condensed by the condenser lens 53, diverges after passing through the spatial filter 300, is collimated by the collimator lens 54, and enters the second imaging element 95.

In contrast, unnecessary light, which is the test light reflected on the optical surface other than the target surface 60*k*, travels backward as light with a different degree of convergence/divergence with respect to the incident light. The unnecessary light passes through the objective lens 55, is partially reflected by the beam splitter 30, and is guided to the spatial filter 300 via the condenser lens 53. However, the unnecessary light does not form an image at a position of the spatial filter 300 because the degree of convergence/divergence thereof is different from that of the measurement light 200*s*. As a result, the spatial filter 300 can reduce the unnecessary light incident on the second imaging element 95.

The second imaging element 95 receives the measurement light 200*s* and the reference light 200*r*. The measurement light 200*s* and the reference light 200*r* interfere with each other, and enter the second imaging element 95 while forming interference fringes. A signal acquired from the light received by the second imaging element 95 is transmitted to the computer 100. At this time, the second imaging element 95 converts the received light into a signal by photoelectric conversion processing or the like. The computer (calculation unit) 100 calculates a wavefront based on the signal (interference signal) of the measurement light 200*s* and the reference light 200*r* acquired by the second imaging element 95. The computer 100 then calculates eccentricity based on the position of the objective lens 55 (the stage 150) and the calculated wavefront.

The interferometer according to the present exemplary embodiment forms, by using the reference stage 160, interference fringes by making a light path length of the measurement light and the light path length of the reference light substantially equal. In contrast, a light path length of the test light reflected on the optical surface other than the target surface 60*k* is not substantially the same as the light path length of the reference light, so that the interference fringes are not formed even if the test light is combined.

A conventional measurement apparatus using an autocollimation method acquires a position of an image formed by reflected light (measurement light) from the target surface to calculate eccentricity of the target surface from the position. However, in a case where the number of optical surfaces is large or a case where a lens with large eccentricity exists in the target optical system, an image may be blurred due to an influence of aberration or vignetting.

Since reflected light (unnecessary light) from the optical surface other than the target surface also enters the imaging element, an image formed by the measurement light cannot be distinguished due to background noise caused by the unnecessary light in some cases. These factors may be causes of decrease in accuracy of eccentricity measurement.

Thus, the measurement apparatus 1 according to the present exemplary embodiment reduces reflected light from the optical surface other than the target surface that enters the second imaging element by the reduction unit (the spatial filter 300). With this configuration, the measurement apparatus 1 can measure eccentricity of the optical surface in the target optical system with high accuracy.

Figure 3:
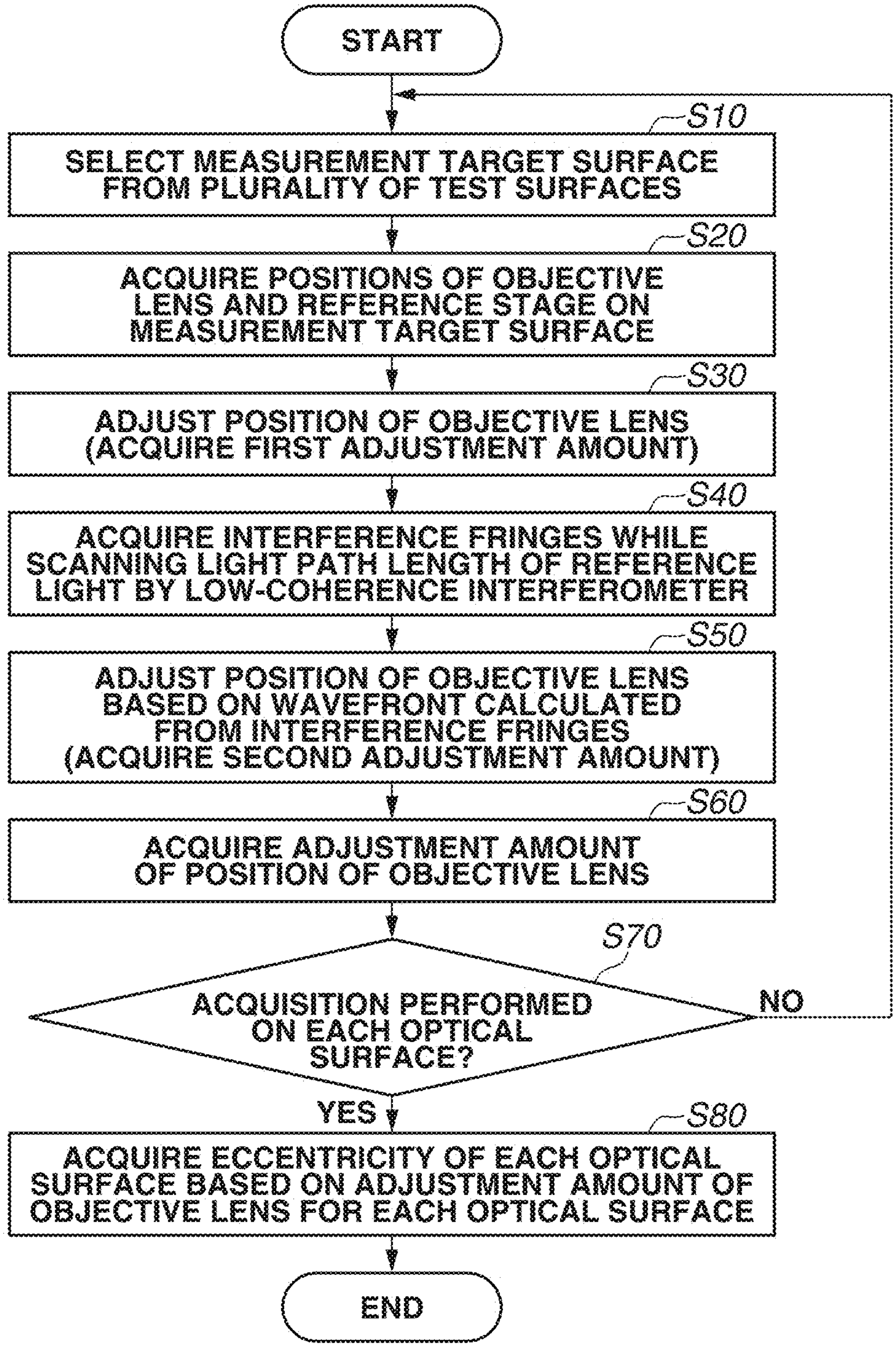
FIG. 3 is a flowchart illustrating a measurement method according to the first exemplary embodiment.

Next, a measurement method according to the present exemplary embodiment will be described with reference to FIG. 3. FIG. 3 is a flowchart illustrating a method for measuring eccentricity of the target optical system according to the first exemplary embodiment.

In step S10, the measurement apparatus 1 selects the target surface 60*k* (the k-th optical surface) from among the plurality of optical surfaces (the number of surfaces is N). The target surface may be selected in order from the first surface to the N-th surface of the target optical system (in order of light path length) or may be selected in order from far to near the position of the apparent center of curvature. The target surface may also be selected in random order.

In step S20, the measurement apparatus 1 acquires the design position of the objective lens 55 and the design position of the reference stage 160 on the target surface. The design position of the objective lens 55 is a position having X, Y, and Z (calculated values) of the objective lens 55 in a state where the position of the origin on the chart image coincides with the position of the apparent center of curvature of the target surface 60*k*. The values are calculated by paraxial calculation or ray tracing using design values of the target optical system 60. The design position of the reference stage 160 is a position of the reference stage 160 in a case where the light path length of the test light reflected on the target surface 60*k* is equal to the light path length of the reference light, and the design position is calculated based on the design value of the target optical system 60.

In step S30, the measurement apparatus 1 adjusts the position of the objective lens 55 with the stage 150 so that the image of the chart 40 is formed at the reference position on the first imaging element 90. In one embodiment, an adjustment amount (or position information) of the objective lens 55 with a first adjustment unit at this time is recorded as a first adjustment amount. In step S30, the objective lens 55 is firstly placed near the design position (initial position), and the position of the objective lens 55 in the Z direction is adjusted such that the image of the chart 40 is formed on the first imaging element 90.

In a case where the target surface 60*k* is eccentric, the chart image deviated from the reference position is observed as illustrated in the lower left diagram in FIG. 2. Thus, the X and Y positions of the objective lens 55 are adjusted by the adjustment unit (the stage 150) so that the image observed on the first imaging element 90 is formed at the reference position (as illustrated in the lower middle diagram in FIG. 2). The adjustment performed in step S30 corresponds to the first adjustment (coarse adjustment) of the objective lens 55.

In step S40, the low-coherence interferometer 400 acquires interference fringes caused by interference between the measurement light (test light) 200*s* and the reference light 200*r* while scanning the light path length of the reference light with the reference stage 160.

In step S50, the measurement apparatus 1 calculates a wavefront based on the interference fringes (interference signal), and adjusts the position of the objective lens 55 based on the wavefront. The measurement apparatus 1 records an adjustment amount (or position information) of the objective lens 55 with a second adjustment unit at this time as a second adjustment amount. The wavefront can be calculated by using, for example, a phase shift method. The X and Y positions of the objective lens 55 can be adjusted based on a tilt component of the wavefront. The Z position of the objective lens 55 can be adjusted based on a defocus component of the wavefront.

According to the present exemplary embodiment, as an example, the tilt component and defocus component of the wavefront are respectively adjusted to be a tilt component (reference amount) and a defocus component (reference amount) of a wavefront acquired when a mirror is inserted parallel to the XY plane between the beam splitter 30 and the objective lens 55. However, it is not necessary to adjust the components until they become exactly the same values as the reference amounts, and it is sufficient to adjust the components to fall within a range of the reference amount $\pm\lambda/2$. The adjustment in step S50 corresponds to fine adjustment (second adjustment) of the objective lens 55.

In step S60, the measurement apparatus 1 acquires the adjustment amount of the position of the objective lens 55. The adjustment amount of the position of the objective lens 55 is the first adjustment amount acquired in step S30, the second adjustment amount acquired in step S50, an amount equivalent to a sum of the first adjustment amount and the second adjustment amount, or information about a final position of the objective lens 55.

In step S70, the measurement apparatus 1 determines whether the adjustment amount of the position of the objective lens 55 has been acquired for each optical surface. If the acquisition is completed (YES in step S70), the processing proceeds to step S80, whereas if the acquisition is not yet completed (NO in step S70), the processing returns to step S10.

In step S80, the measurement apparatus 1 calculates eccentricity of each optical surface based on the adjustment amount of the objective lens 55 for each optical surface. According to the present exemplary embodiment, the measurement apparatus 1 calculates the eccentricity from the first surface to the N-th surface in the target optical system in order (in order of light path length). The relative position between the objective lens 55 and the target optical system 60 is determined from the adjustment amount of the objective lens 55, and the eccentricity of the target surface 60*k* can be calculated by using paraxial calculation or ray tracing from the objective lens 55 to the target surface 60*k*. In one embodiment, in a case where the eccentricity of the k-th surface is calculated, the eccentricity of each of the first to (k−1)-th surfaces is required, and thus the eccentricity in order from the first surface is calculated.

According to the present exemplary embodiment, lighting of the first light source 11 and the second light source 10 is divided in time. With this configuration there is no need to perform processing such as image processing for dividing a signal from the received reflected light.

According to the present exemplary embodiment, the first light source 11, the objective lens 55, and the first imaging element 90 for acquiring a chart image are not essential, and the effect of the present embodiment can be achieved by the interferometer and the reduction unit. Similarly, the reduction unit is not essential, and eccentricity of the target optical system can be measured with high accuracy using the configuration for acquiring a chart image and the interferometer.

In a case where a conventional measurement apparatus that calculates eccentricity of a target surface from a wavefront acquired by a low-coherence interferometer measures an optical system that includes an optical surface with large eccentricity, a light path of reflected light is significantly tilted, and interference fringes become dense, so that a wavefront cannot be acquired with high accuracy. In addition, an influence of background noise due to reflected light from the optical surface other than the target surface is also a factor in decreasing the accuracy. Thus, the adjustment unit in the measurement apparatus 1 according to the present exemplary embodiment adjusts, in step S30, the relative position between the objective lens 55 and the target optical system 60 such that a chart image is formed at the reference position on the first imaging element 90. Adjustment using the adjustment unit is performed, so that the tilt of the light path of the reflected light is reduced, and non-dense interference fringes are acquired. Further, the adjustment using the adjustment unit enables the measurement light (low-coherence light) 200 to pass through the spatial filter 300, and the unnecessary light can be separated from the measurement light 200. The background noise is sufficiently reduced, so that the position of the objective lens 55 can be adjusted with high accuracy based on the wavefront. As a result, the accuracy of eccentricity measurement can be improved.

Figure 4:
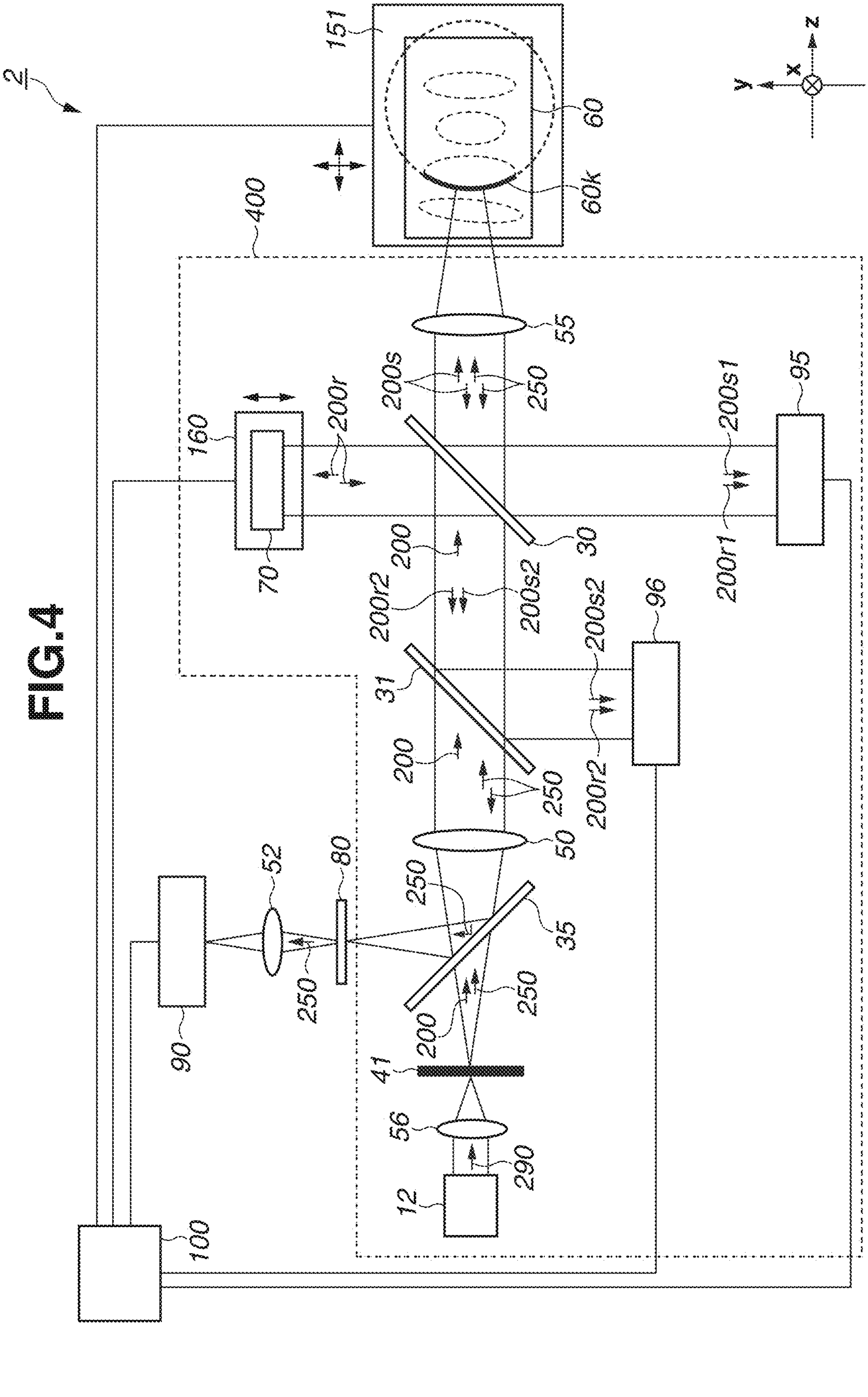
FIG. 4 illustrates a configuration of a measurement apparatus according to a second exemplary embodiment.

FIG. 4 illustrates a configuration of a measurement apparatus 2 according to a second exemplary embodiment.

The measurement apparatus 2 includes alight source 12, a chart 41, the objective lens 55, the first imaging element 90, a stage (adjustment unit) 151, the low-coherence interferometer 400, and the computer (calculation unit) 100. The light source 12 according to the present exemplary embodiment is different from that according to the first exemplary embodiment in that the light source 12 functions as the first light source and the second light source.

The light source 12 emits the illumination light 290 and illuminates the transmissive chart 41 via a condenser lens 56. The chart 41 according to the present exemplary embodiment is a chart (pinhole) including only the white circle (the origin) without the white triangles in the upper left diagram in FIG. 2. The chart 41 emits divergent light (the index light 250 and the low-coherence light 200).

The index light 250 passes through the beam splitter 35, is collimated by the collimator lens 50, passes through beam splitters 31 and 30, is condensed by the objective lens 55, and enters the target optical system 60.

The stage 151 is driven in the X, Y, and Z directions, respectively. The target optical system 60 is placed on the stage 151. The stage 151 adjusts the position of the target optical system 60 with respect to a position of a chart image formed by the index light 250. A position of the stage 151 is managed by the computer 100.

In measurement, the position (X, Y, Z) of the origin of the chart image formed by the index light 250 is brought close to the position (Xc, Yc, Zc) of the apparent center of curvature of the k-th (k=1, 2, . . . , N) optical surface (the target surface 60*k*) in the target optical system 60. Accordingly, the index light 250 is reflected on the target surface 60*k* and travels backward along a light path similar to the incident light path. The index light 250 reflected on the target surface 60*k* passes through the objective lens 55, the beam splitters 30 and 31, the collimator lens 50, the beam splitter 35, the image-forming surface chart 80, and the imaging lens 52, and then enters the first imaging element 90.

The low-coherence interferometer 400 according to the present exemplary embodiment is a Twyman-Green type interferometer including the light source 12, the collimator lens 50, the beam splitters 30 and 31, the objective lens 55, the reference mirror 70, the reference stage (change unit) 160, and the second imaging elements 95 and 96. In the interferometer according to the present exemplary embodiment, a light path length from the beam splitter 30 to the second imaging element 95 is substantially equal to a light path length from the beam splitter 30 to the second imaging element 96. A shape of the wavefront changes depending on a propagation distance (light path length) from the beam splitter 30 to the second imaging element. According to the present exemplary embodiment, the above-described configuration is adopted so that the shapes of the wavefronts are substantially the same at the second imaging elements 95 and 96.

The low-coherence light 200 passes through the beam splitter 35, is collimated by the collimator lens 50, passes through the beam splitter 31, and is split by the beam splitter 30 into reflected light (reference light) 200*r* and transmitted light (test light) 200*s*.

The reference light 200*r* reflected by the beam splitter 30 is reflected by the reference mirror 70 placed on the reference stage 160 and returns to the beam splitter 30. Light 200*r*1, which is a portion of the reference light 200*r*, passes through the beam splitter 30 and enters the second imaging element 95. Light 200*r*2, which is a portion of the reference light 200*r*, is reflected by the beam splitters 30 and 31 and enters the other second imaging element 96. The position of the reference stage 160 is managed by the computer 100.

The test light 200*s* having passed through the beam splitter 30 is condensed by the objective lens 55 and enters the target optical system 60. Similarly to the index light 250, the test light 200*s* is reflected on the target surface 60*k* and travels backward along a light path similar to the incident light path in a case where the position of the apparent condensing point of the test light 200*s* coincides with the position of the apparent center of curvature of the target surface 60*k*. The test light (measurement light) 200*s* reflected on the target surface 60*k* is collimated by the objective lens 55 and reaches the beam splitter 30. Light 200*s*1, which is a portion of the measurement light 200*s*, is reflected by the beam splitter 30 and enters the second imaging element 95. Light 200*s*2, which is a portion of the measurement light 200*s*, passes through the beam splitter 30, is reflected by the beam splitter 31, and enters the other second imaging element 96.

In one embodiment, a sum of intensities of test light 200*s*1 and reference light 200*r*1 that have entered the second imaging element 95 and a sum of intensities of the test light 200*s*2 and reference light 200*r*2 that have entered the second imaging element 96 are adjusted in advance to be the same signal intensity A(x, y). The signal intensity may be adjusted by changing an exposure time or a gain of each imaging element, or by inserting an ND filter in front of the imaging element.

The measurement light 200*s*1 and the reference light 200*r*1 enter the second imaging element 95 while forming interference fringes (first interference fringes). A first signal I1(*x, y*) acquired based on the light received by the second imaging element 95 is transmitted to the computer 100. The first signal I1(*x, y*) is expressed by a following formula (1) using an amplitude B(x, y) of the interference fringes, a wavefront ((x, y), and an intensity N(x, y) of the test light (unnecessary light) reflected on the optical surface other than the target surface 60*k*.

$$I1(x, y) = A(x, y) + B(x, y)\cos(\Phi(x, y)) + N(x, y) \tag{1}$$

Similarly, measurement light 200*s*2 and the reference light 200*r*2 enter the second imaging element 95 while forming interference fringes (second interference fringes). A second signal I2(*x, y*) acquired based on the light received by the second imaging element 95 is transmitted to the computer 100. The second signal I2(*x, y*) is expressed by a following formula (2) using the amplitude B(x, y) of the interference fringes, the wavefront ((x, y), and the intensity N(x, y) of the test light (unnecessary light) reflected on the optical surface other than the target surface 60*k*. A phase of the second signal I2(*x, y*) is inverted with respect to that of the first signal I1(*x, y*).

$$I2(x, y) = A(x, y) + B(x, y)\cos(\Phi(x, y) + \pi) + N(x, y) \tag{2}$$

The reduction unit according to the present exemplary embodiment reduces an influence of the unnecessary light by performing calculation processing for calculating a differential interference signal D(x, y) between the first signal I1(*x, y*) expressed by formula (1) and the second signal I2(*x, y*) expressed by formula (2). The differential interference signal D(x, y) is expressed by a following formula (3).

$$D(x, y) = 2B(x, y)\cos(\Phi(x, y)) \tag{3}$$

With this configuration, background noise of interference fringes can be reduced, and the accuracy of eccentricity measurement can thereby be improved. The reduction unit according to the present exemplary embodiment is executed by calculation processing by the computer 100.

The reduction unit according to the present exemplary embodiment is not limited to this, and may be configured with a circuit (not illustrated) for communicating a signal between the second imaging elements 95 and 96 and the computer 100, a central processing unit (CPU) different from the computer 100, or a calculation apparatus.

The reduction unit according to the present exemplary embodiment and the reduction unit (spatial filter) according to the first exemplary embodiment may also be combined. The reduction unit according to the first exemplary embodiment can be combined by arranging the condenser lens, the spatial filter, and the collimator lens in front of each of the second imaging elements 95 and 96 of the measurement apparatus 2 according to the present exemplary embodiment.

In one embodiment, the reduction unit using calculation processing according to the present exemplary embodiment is combined with separation of unnecessary light with the spatial filter, since this can further reduce the influence of unnecessary light.

Figure 5:
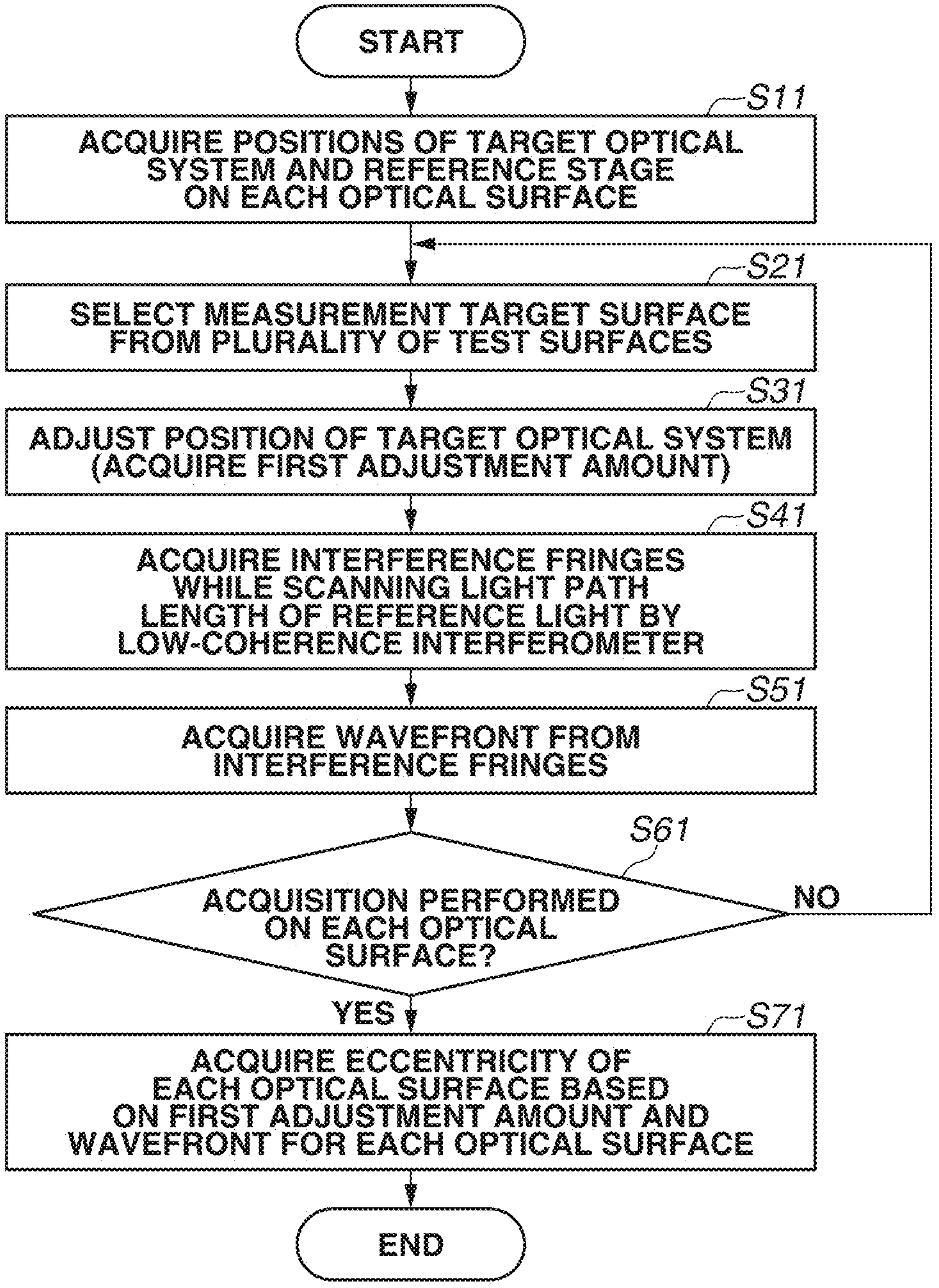
FIG. 5 is a flowchart illustrating a measurement method according to the second exemplary embodiment.

FIG. 5 is a flowchart illustrating a method for measuring eccentricity of the target optical system according to the second exemplary embodiment.

In step S11, the measurement apparatus 2 acquires the design position of the target optical system 60 and the design position of the reference stage 160 on each optical surface.

In step S21, the measurement apparatus 2 selects the target surface 60*k* (the k-th optical surface) from among the plurality of optical surfaces (the number of surfaces is N).

In step S31, the measurement apparatus 2 adjusts the position of the target optical system 60 with the stage 151 so that the image of the chart 40 is formed at the reference position on the first imaging element 90. In one embodiment, an adjustment amount (or position information) of the target optical system 60 by the first adjustment unit at this time is recorded as the first adjustment amount.

In step S41, the low-coherence interferometer 400 acquires the interference fringes by scanning the light path length of the reference light using the reference stage 160.

In step S51, the measurement apparatus 2 calculates the wavefront from the interference fringes. According to the present exemplary embodiment, second adjustment (fine adjustment) of the target optical system 60 performed by the second adjustment unit based on the wavefront is not performed unlike the first exemplary embodiment, and the wavefront is acquired from the interference fringes.

In step S61, the measurement apparatus 2 determines whether the first adjustment amount and the wavefront with respect to each optical surface have been acquired. If the acquisition is completed (YES in step S61), the processing proceeds to step S71, whereas if the acquisition is not yet completed (NO in step S61), the processing returns to step S21.

In step S71, the measurement apparatus 2 calculates eccentricity of each optical surface from the first adjustment amount and the wavefront of each optical surface. In step S71 according to the present exemplary embodiment, an amount equivalent to the second adjustment amount according to the first exemplary embodiment is calculated by paraxial calculation or ray tracing using the relative position between the objective lens 55 and the target optical system 60 at the time of acquiring the wavefront of the target surface 60*k* and the wavefront at that time. The eccentricity of the target surface 60*k* is then calculated based on the first adjustment amount and the second adjustment amount.

In the measurement apparatus 2 according to the present exemplary embodiment, the reduction unit executes processing for calculating a difference between interference fringes I0($x$, $y$) and I1($x$, $y$) formed by reflection or transmission at the beam splitter 30. With this configuration, background noise of the interference fringes can be reduced, and the eccentricity of the optical surface in the target optical system can be measured with high accuracy.

In the measurement method according to the present exemplary embodiment, the relative position of the target optical system 60 with respect to the objective lens 55 is adjusted (coarsely adjusted) so that the chart image is formed at the reference position on the first imaging element 90, and then the low-coherence interferometer 400 acquires the interference fringes. This configuration makes it possible to acquire non-dense interference fringes. As a result, the wavefront can be calculated with high accuracy, and the measurement accuracy of the eccentricity acquired based on the wavefront can be improved.

Figure 6:
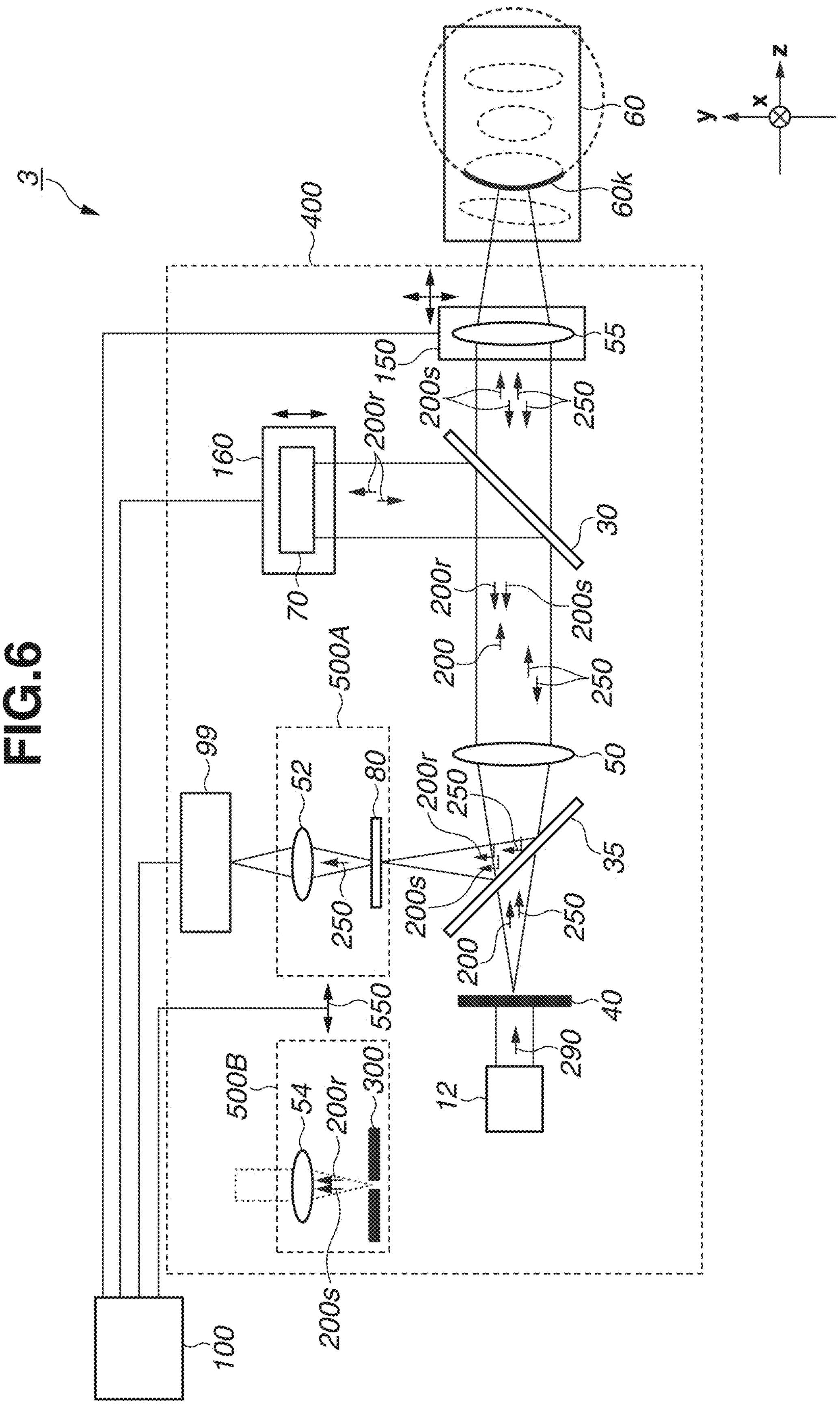
FIG. 6 illustrates a configuration of a measurement apparatus according to a third exemplary embodiment.

FIG. 6 illustrates a configuration of a measurement apparatus 3 according to a third exemplary embodiment.

The measurement apparatus 3 includes the light source 12, the chart 40, the objective lens 55, an imaging element 99, the stage (adjustment unit) 150, the low-coherence interferometer 400, and the computer (calculation unit) 100. The light source 12 according to the present exemplary embodiment functions as the first light source and the second light source as with the second exemplary embodiment. The imaging element 99 according to the present exemplary embodiment is different from that in the first exemplary embodiment in that the imaging element 99 functions as the first imaging element and the second imaging element depending on the optical system inserted by an exchange unit 550, which is described below.

The measurement apparatus 3 also includes the image-forming surface chart 80, the imaging lens 52, an optical system 500A for acquiring a chart image, the spatial filter 300, the collimator lens 54, an optical system 500B for acquiring interference fringes, and the exchange unit 550. The optical system (optical system for acquiring a chart image) 500A and the optical system (optical system for acquiring interference fringes) 500B are configured to be interchangeable. The exchange unit 550 is configured with a stage and the like, inserts the optical system 500A into the light path when a chart image is acquired, and inserts the optical system 500B into the light path when interference fringes are acquired.

The index light 250 passes through the beam splitter 35, is collimated by the collimator lens 50, passes through beam splitter 30, is condensed by the objective lens 55, and enters the target optical system 60.

The position (X, Y, Z) of the origin of the chart image formed by the index light 250 is brought close to the position (Xc, Yc, Zc) of the apparent center of curvature of the k-th (k=1, 2, . . . , N) optical surface (the target surface 60*k*) in the target optical system 60. Accordingly, the index light 250 is reflected on the target surface 60*k* and travels backward along a light path similar to the incident light path. The index light 250 reflected on the target surface 60*k* passes through the objective lens 55, the beam splitter 30, the collimator lens 50, the beam splitter 35, and the optical system 500A, and enters the imaging element 99 (first imaging element).

The low-coherence interferometer 400 according to the present exemplary embodiment is a Twyman-Green type interferometer including the light source 12, the collimator lens 50, the beam splitter 30, the objective lens 55, the reference mirror 70, the reference stage (change unit) 160, the optical system 500B, and the imaging element 99 (second imaging element).

The low-coherence light 200 passes through the beam splitter 35, is collimated by the collimator lens 50, and is split by the beam splitter 30 into the reflected light (reference light) 200*s* and the transmitted light (test light) 200*r*.

The reference light 200*r* reflected by the beam splitter 30 is reflected by the reference mirror 70 placed on the reference stage 160, and returns to the beam splitter 30. A portion of the reference light 200*r* is reflected by the beam splitter 30, condensed by the collimator lens 50, reflected by the beam splitter 35, and guided to the spatial filter (reduction unit) 300 in the optical system 500B. The reference light 200*r* having passed through the spatial filter 300 diverges, is collimated by the collimator lens 54, and enters the imaging element 99.

The test light 200*s* having passed through the beam splitter 30 is condensed by the objective lens 55, and enters the target optical system 60. Similarly to the index light 250, the test light 200*s* is reflected on the target surface 60*k* and travels backward along a light path similar to the incident light path in a case where the position of the apparent condensing point of the test light 200*s* coincides with the position of the apparent center of curvature of the target surface 60*k*. The test light (measurement light) 200*s* reflected on the target surface 60*k* is collimated by the objective lens 55 and reaches the beam splitter 30. A portion of the measurement light 200*s* passes through the beam splitter 30, is condensed by the collimator lens 50, reflected by the beam splitter 35, and condensed by the spatial filter 300 in the optical system 500B. A portion of the measurement light 200*s* having passed through the spatial filter 300 diverges, is collimated by the collimator lens 54, and enters the imaging element 99. The reduction unit according to the present exemplary embodiment is the spatial filter 300 that reduces the unnecessary light entering the second imaging element 95 using a difference in the degree of convergence/divergence between the unnecessary light and the measurement light 200*s*.

The measurement light 200*s* and the reference light 200*r* form the interference fringes, and the interference fringes are received by the imaging element 99. A signal acquired based on the light received by the imaging element 99 is transmitted to the computer 100.

In the measurement apparatus 3 according to the present exemplary embodiment, the unnecessary light is blocked by the reduction unit (spatial filter 300). With this configuration, the measurement apparatus 3 can measure the eccentricity of the optical surface in the target optical system with high accuracy.

The objective lens 55 is adjusted (coarsely adjusted) such that the chart image is formed at the reference position on the first imaging element 90, and then the low-coherence interferometer 400 acquires the interference fringes. It is thus easier to acquire non-dense interference fringes. As a result, the eccentricity is calculated with the wavefront acquired based on the non-dense interference fringes, and thus eccentricity measurement can be realized with high accuracy.

Figure 7:
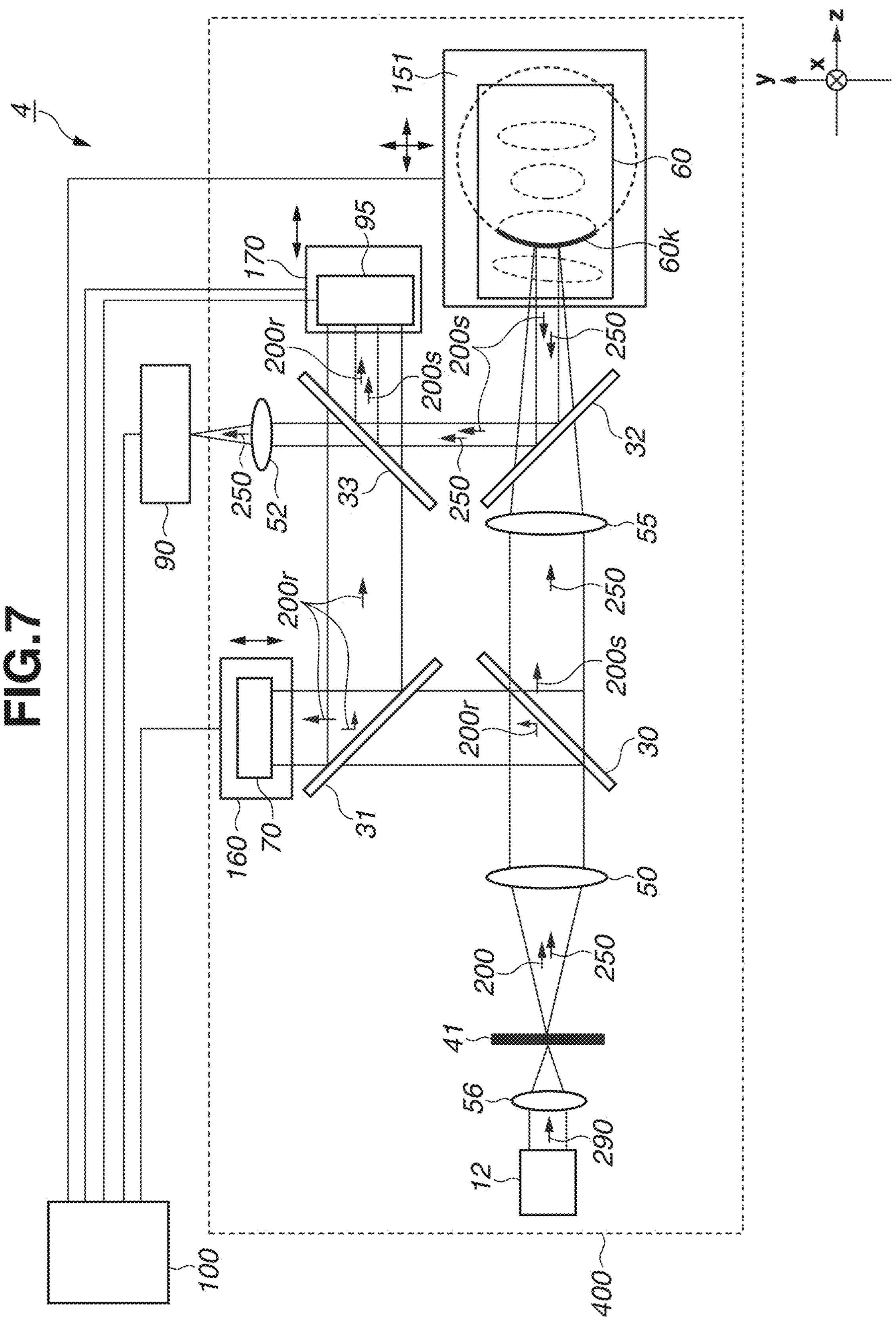
FIG. 7 illustrates a configuration of a measurement apparatus according to a fourth exemplary embodiment.

FIG. 7 illustrates a configuration of a measurement apparatus 4 according to a fourth exemplary embodiment.

The measurement apparatus 4 includes the light source 12, the chart 41, the objective lens 55, the first imaging element 90, the stage (adjustment unit) 150, the low-coherence interferometer 400, and the computer (calculation unit) 100. The light source 12 according to the present exemplary embodiment functions as the first light source and the second light source as with the second and third exemplary embodiments.

The index light 250 is collimated by the collimator lens 50, passes through the beam splitter 30, is condensed by the objective lens 55, passes through a beam splitter 32, and enters the target optical system 60. The target optical system 60 is placed on the stage (adjustment unit) 151 that moves in the X, Y, or Z directions, and can adjust the relative position between the position of the chart image formed by the index light 250 and the position of the target optical system 60. The position of the stage 151 is managed by the computer 100.

In a case where a virtual image of the chart 41 is formed at a negative infinity position on the Z axis by the index light 250 reflected on the target surface 60*k*, the index light 250 is emitted from the target optical system 60 as collimated light. The index light 250 reflected on the target surface 60*k* is reflected by the beam splitter 32, passes through a beam splitter 33, is condensed by the imaging lens 52, and enters the first imaging element 90. An image acquired by the first imaging element 90 is transmitted to the computer 100.

The low-coherence interferometer 400 according to the present exemplary embodiment is a Mach-Zehnder type interferometer including the light source 12, the collimator lens 50, the beam splitters 30 to 33, the objective lens 55, the reference mirror 70, the reference stage (change unit) 160, and the second imaging element 95. The second imaging element 95 is placed on a stage 170 that is driven in the Z direction, so that a position where interference light of the measurement light 200*s* and the reference light 200*r* enters can be adjusted. A position of the stage 170 is managed by the computer 100.

The low-coherence light 200 is collimated by the collimator lens 50 and is split by the beam splitter 30 into the reflected light (reference light) 200*r* and the transmitted light (test light) 200*s*.

The reference light 200*r* reflected by the beam splitter 30 passes through the beam splitter 31, is reflected by the reference mirror 70 placed on the reference stage 160, and returns to the beam splitter 31. Thereafter, the reference light 200*r* is reflected by the beam splitter 31, passes through the beam splitter 33, and enters the second imaging element 95.

The test light 200*s* having passed through the beam splitter 30 is condensed by the objective lens 55, passes through the beam splitter 32, and enters the target optical system 60 (is guided to the target surface 60*k*). The test light (measurement light) 200*s* reflected on the target surface 60*k* is emitted from the target optical system 60 as collimated light as with the index light 250, is reflected by the beam splitters 32 and 33, and enters the second imaging element 95.

In contrast, the test light (unnecessary light) reflected on the optical surface other than the target surface 60*k* converges or diverges, is emitted from the target optical system 60, and also enters the second imaging element 95 in a form of convergent or divergent light. According to the present exemplary embodiment, the position of the second imaging element 95 is adjusted by the stage (reduction unit) 170 to minimize the influence of the unnecessary light, and the interference light between the measurement light 200*s* and the reference light 200*r* is received by the second imaging element 95 to acquire interference fringes. A signal acquired based on the light received by the second imaging element 95 is transmitted to the computer 100.

With this configuration, the position of the second imaging element 95 is adjusted by the reduction unit (the stage 170), and the influence of background noise can be reduced. As a result, a highly accurate wavefront can be acquired, and the measurement accuracy of the eccentricity can be improved.

In the measurement method according to the present exemplary embodiment, the relative position between the objective lens 55 and the target optical system 60 is also adjusted (coarsely adjusted) such that the chart image is formed at the reference position on the first imaging element 90, and then the low-coherence interferometer 400 acquires the interference fringes. With this configuration, non-dense interference fringes can be acquired. As a result, the wavefront can be calculated with high accuracy, and the measurement accuracy of the eccentricity acquired based on the wavefront can be improved.

Figure 8:
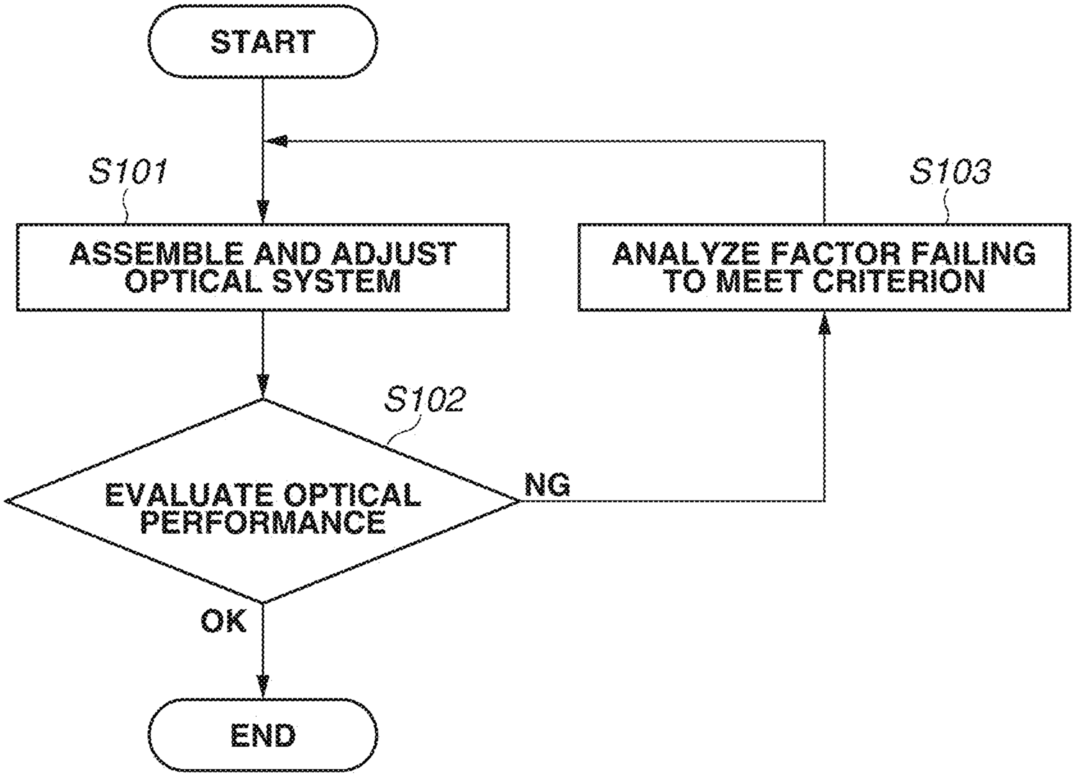
FIG. 8 is a flowchart illustrating a manufacturing method of an optical system using a measurement apparatus according to each exemplary embodiment.

FIG. 8 is a flowchart illustrating a manufacturing method of an optical system according to the present exemplary embodiment.

A result of eccentricity measured using any one of the measurement apparatuses 1 to 4 described in the first to the fourth exemplary embodiments can be fed back to a manufacturing method for the optical system (target optical system 60).

In step S101, a manufacturer assembles an optical system using a plurality of optical elements (lenses and the like) and adjusts a position of each optical element.

In step S102, the manufacturer evaluates precision and performance of the assembled and adjusted optical system. In a case where an evaluation result that satisfies a criterion is not acquired (NG in step S102), the processing proceeds to step S103. In step S103, an analysis is performed to determine a factor of failure to satisfy the criterion. One of analysis objects is eccentricity of the optical element. Any one of the measurement apparatuses 1 to 4 can be used to measure the eccentricity. In contrast, in a case where an evaluation result that satisfies the criterion is acquired (OK in step S102), manufacturing of the optical system according to the present manufacturing method is terminated.

The result of the measurement of eccentricity can be utilized not only for the analysis of the unsatisfactory factor in step S103 but also for the position adjustment of the optical element in step S101. In other words, it is possible to measure eccentricity of a plurality of optical elements in the optical system using any one of the measurement apparatuses 1 to 4 and to adjust positions of the optical elements using the result.

While the embodiments of the disclosure has been described with reference to the exemplary embodiments, it is to be understood that the disclosure is not limited to these exemplary embodiments and can be combined, modified, and changed in various ways within a range not departing from the scope of the disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the embodiments of the disclosure has been described above, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-016724, filed Feb. 6, 2024, which is hereby incorporated by reference herein in its entirety.

What is claimed is:

1. An apparatus configured to measure eccentricity of an optical system based on a wavefront acquired for each target surface in a plurality of optical surfaces in the optical system, the apparatus comprising:

a first light source configured to illuminate a chart including an index surface on which an index is provided;

an objective lens configured to guide index light emitted from the chart to the optical system;

a first element configured to receive the index light reflected on an optical surface in the optical system;

an interferometer including a second light source and a second element, and configured to split light from the second light source into test light and reference light and to receive measurement light via the objective lens and the reference light with the second element, to acquire a wavefront of the measurement light, the measurement light being the test light reflected on the target surface; and a reduction unit configured to reduce an intensity of a signal of light reflected on an optical surface other than the target surface, of the test light reflected on the plurality of optical surfaces and received by the second element.

2. The apparatus according to claim 1, wherein the reduction unit is a spatial filter.

3. The apparatus according to claim 2, wherein the spatial filter is a pinhole.

4. The apparatus according to claim 1, wherein the reduction unit is configured to adjust a position of the second element.

5. The apparatus according to claim 1, wherein the interferometer includes a beam splitter, and wherein the reduction unit is configured to acquire a first signal obtained by receiving the reference light and the measurement light reflected by the beam splitter and a second signal obtained by receiving the reference light and the measurement light having passed through the beam splitter and acquire the wavefront based on a difference between the first signal and the second signal.

6. The apparatus according to claim 1, wherein the reduction unit is configured to reduce the intensity of the signal of light reflected on the optical surface other than the target surface to be smaller than an intensity of a signal of the measurement light.

7. The apparatus according to claim 1, further comprising a first adjustment unit configured to adjust a relative position between the objective lens and the optical system based on a position of an image formed by index light received by the first element.

8. The apparatus according to claim 7, wherein eccentricity of the target surface is measured based on a first adjustment amount and the wavefront, the first adjustment amount being acquired in a case where the first adjustment unit adjusts the relative position.

9. The apparatus according to claim 8, further comprising a second adjustment unit configured to adjust a tilt component of the wavefront, wherein eccentricity of the target surface is measured based on the first adjustment amount and a second adjustment amount that is acquired in a case where the second adjustment unit adjusts the relative position.

10. The apparatus according to claim 1, wherein the interferometer includes a change unit configured to change a light path length of the reference light.

11. The apparatus according to claim 1, further comprising a diaphragm in a light path from the second light source to the objective lens.

12. An apparatus configured to measure eccentricity of a system based on a wavefront acquired for each target surface in a plurality of optical surfaces in the optical system, the apparatus comprising:

an interferometer configured to include a light source and an element, split light from the light source into test light and reference light, and receive light via an objective lens and the reference light with the element, and acquire a wavefront of the measurement light, the measurement light being the test light reflected on the target surface; and a reduction unit configured to reduce intensity of a signal of light reflected on an optical surface other than the target surface, of the test light reflected on the plurality of optical surfaces and received by the element.

13. An apparatus configured to measure eccentricity of an optical system based on a wavefront acquired for each target surface in a plurality of optical surfaces in the optical system, the apparatus comprising:

a first light source configured to illuminate a chart including an index surface on which an index is provided;

an objective lens configured to guide index light emitted from the chart to the optical system;

a first element configured to receive the index light reflected on an optical surface in the optical system; and an interferometer configured to include a second light source and a second element, split light from the second light source into test light and reference light, receive light via the objective lens and the reference light with the second element, and acquire a wavefront of the measurement light, the measurement light being the test light reflected on the target surface.

14. A method for measuring eccentricity of an optical system based on a wavefront acquired for each target surface in a plurality of optical surfaces in the optical system, the method comprising:

illuminating a chart including an index surface on which an index is provided;

capturing an image by making index light emitted from the chart to enter the optical system via an objective lens and receiving the index light reflected on the plurality of optical surfaces in the optical system with a first element;

splitting light emitted from a second light source into test light and reference light, receiving, with a second element, the reference light and measurement light that is the test light having passed through the objective lens and reflected on the target surface, and acquiring a wavefront of the measurement light; and reducing intensity of a signal of light reflected on an optical surface other than the target surface of the test light reflected on the plurality of optical surfaces and received by the second element in the acquiring.

15. The method according to claim 14, further comprising:

acquiring a first signal obtained by receiving the reference light and the measurement light reflected by the beam splitter and a second signal obtained by receiving the reference light and the measurement light having passed through the beam splitter and acquiring the wavefront based on a difference between the first signal and the second signal.

16. The method according to claim 14, wherein the reducing adjusts a position of the second element.

17. The method according to claim 14, wherein the reducing reduces the intensity of the signal of light reflected on the optical surface other than the target surface to be smaller than an intensity of a signal of the measurement light.

18. The method according to claim 14, further comprising adjusting a relative position between the objective lens and the optical system based on a position of an image formed by index light received by the first element.

19. The method according to claim 14, further comprising changing a light path length of the reference light.

20. A method for manufacturing an optical system comprising:

measuring eccentricity of the optical system by using the method according to claim 14; and adjusting the optical system by using a measured result of the eccentricity of the optical system.

* * * * *